United States Patent [19]

Hans

[11] Patent Number: 5,014,224
[45] Date of Patent: May 7, 1991

[54] TACTILE SENSOR

[75] Inventor: Richter Hans, Augsburg, Fed. Rep. of Germany

[73] Assignee: Blomberg Robotertecknik GmbH, Ahlen, Fed. Rep. of Germany

[21] Appl. No.: 379,211

[22] Filed: Jul. 13, 1989

[30] Foreign Application Priority Data

Jul. 14, 1988 [DE] Fed. Rep. of Germany ... 8809052[U]
Sep. 29, 1988 [DE] Fed. Rep. of Germany ....... 3832974
Feb. 2, 1989 [DE] Fed. Rep. of Germany ....... 3903094

[51] Int. Cl.$^5$ ............................................. H01C 10/10
[52] U.S. Cl. ..................................... 338/99; 338/114
[58] Field of Search ............................ 338/99, 114, 71

[56] References Cited

U.S. PATENT DOCUMENTS 4,746,894 5/1988 Zeldman ............................... 338/99

Primary Examiner—Bruce A. Reynolds
Assistant Examiner—Marvin Lateef
Attorney, Agent, or Firm—Pascal & Associates

[57] ABSTRACT

In a tactile sensor, a first conductive path made of an electrically resistive material, which is elastic, is fixed to a foil-like base. At points of intersection with good electrically conducting conductive paths, which are fixed to a second elastic foil, the first conductive path has a uniformly curved convex surface. If pressure is exerted on the second flat foil, then the convex surface of the first conductive path is deformed in the area where the pressure is exerted so that, in this area, the first good electrically conducting conductive path presses against the first conductive path over a pressure-responsive longitudinal area, so that the total resistance of the first conductive path changes in a pressure-responsive manner. By measuring the total resistance and the potential of the good electrically conducting conductive paths, the pressure exertion can be determined as to location and amount of pressure.

17 Claims, 5 Drawing Sheets

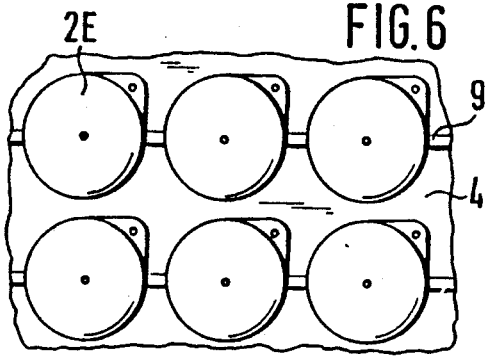
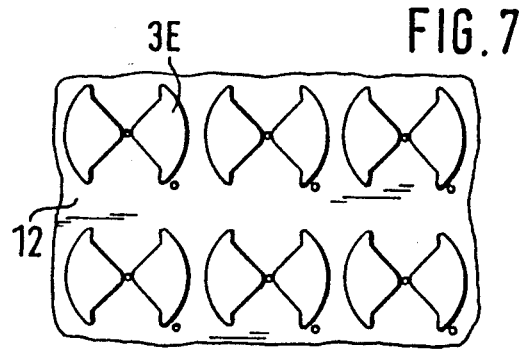
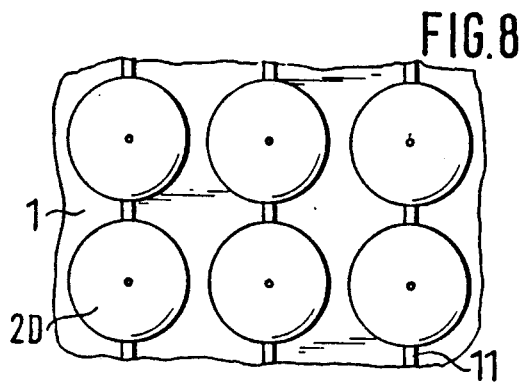
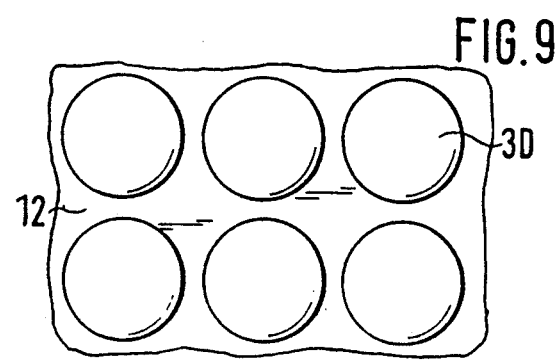
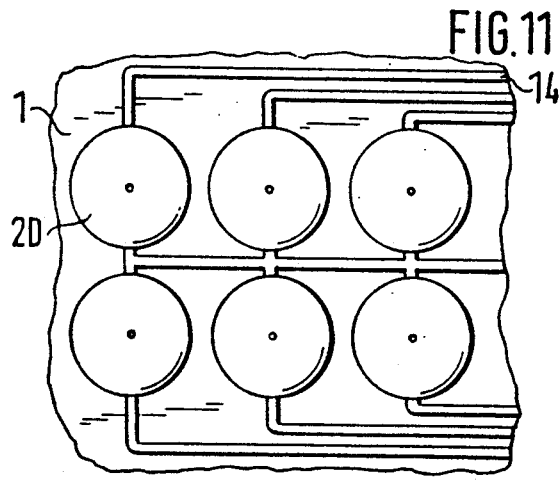
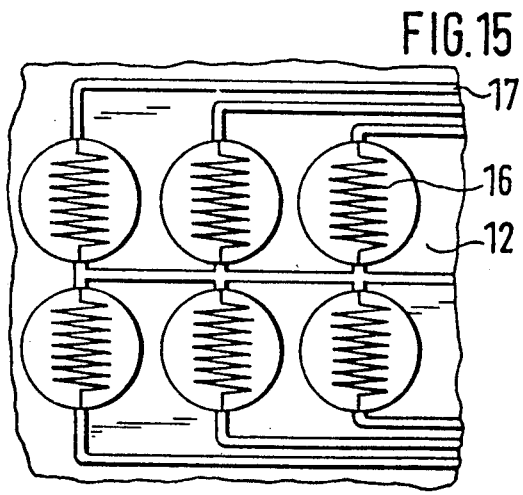
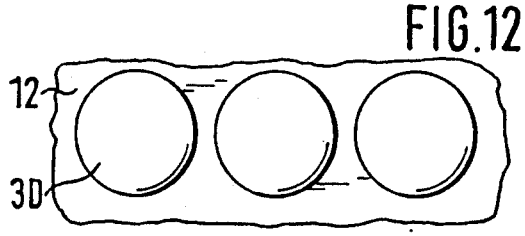
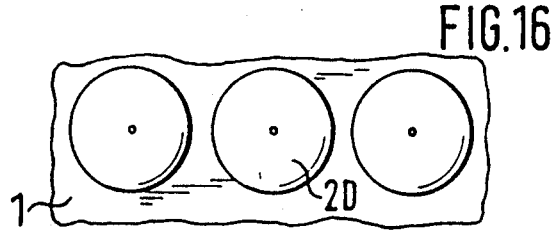

TACTILE SENSOR

The invention relates to a tactile sensor which is useful in the field of robotics, computer control, or the like.

BACKGROUND TO THE INVENTION

A tactile sensor described in patent document GB-A 2,136,966 has a first plate which is situated on conducting strips extending in an X direction, the conducting strips being attached at one end to resistance strips extending at right angles thereto. Spaced therefrom is a centre plate made of a conductive material. At a distance from this plate, a second plate is provided which is constructed similarly as the first plate but is rotated by 90° relative to it, so that the conducting strips extend in a Y direction. A reference potential is applied to the centre plate which is also applied to one end of each of the two resistance strips. At the other end of each of the resistance strips, the potential is sensed. If a pressure is exerted on the sensor which causes the centre plate to come into contact with the conducting strips of the first and second plates, then the location at which the pressure acts on the sensor can be determined by sensing the potentials at the other ends of the resistance strips.

Thus, that tactile sensor has numerous pressure-sensitive measuring cells each comprised of a first conductor path associated with the first plate, a second conductor path associated with the second plate and the conductive material of the centre plate.

Although it is possible with that tactile sensor to detect the location where the pressure acts, it is however not possible to determine the amount of pressure.

In order to be able to ascertain the amount of a pressure and the location where the pressure acts, plates can be used which are made from a material whose electrical resistance varies with the amount of pressure. A tactile sensor of this type is, for example, the subject of U.S. Pat. No. 4,208,648. The latter sensor is comprised of a first plate in which electrical conductors extend in an X direction, a centre plate made of the above-mentioned material and a second plate in which the conductors extend in a Y direction. The disadvantage of this tactile sensor is that the location and amount of pressure can only be measured relatively inaccurately. Moreover, the pressure-resistance ratio of the centre plate depends on many factors, such as, for example, the ambient temperature.

SUMMARY OF THE INVENTION

It is an object of the present invention to improve the tactile sensor of the above type in such a way that, with simple construction, in addition to the location the amount of pressure can also be measured with a high degree of accuracy.

An embodiment of the present invention is a tactile sensor comprised of at least two parallel plates, at least one of the plates being elastic, the plates being formed into a number of pressure-sensitive measuring cells, each cell having a first conductive path of one plate and a second conductive path of the other plate, one of the two conductive paths being comprised of good electrically conductive material, the two conductive paths of each cell extending in the same direction, the other conductive path being comprised of electrically resistive material, at least one of the conductive paths being in the form of a uniformly curved surface, means for retaining the two conductive paths of a cell adjacent each other whereby when pressure is exerted resulting in deformation of the elastic material of the elastic, the plate conductive paths come into contact with each other, the length of the contact being proportionate to the pressure, thus causing variation of the resistance of the other conductive path, allowing the pressure at the point at which the pressure is exerted to be determined by measurement of the resistance of the other conductive path.

BRIEF INTRODUCTION TO THE DRAWINGS

Embodiments of the invention will be explained in greater detail below with reference to the drawings, in which:

FIG. 1 is a section of a part of a first embodiment of the sensor along the line A—A of FIG. 2, FIG. 2 is a section along the line B of FIG. 1, FIG. 3 is a section along the line C of FIG. 1, FIG. 4 is a section corresponding to FIG. 2 while pressure is acting on the first embodiment of the sensor, FIG. 5 is a section through a second embodiment of the sensor, FIG. 6 is a section along the line A—A in FIG. 5;

FIG. 7 is a section along the line B—B in FIG. 5;

FIG. 8 is a section along the line C—C in FIG. 5;

FIG. 9 is a section along the line D—D in FIG. 5 in the second embodiment of the sensor;

FIG. 11 is a section along the line E—E in FIG. 10;

FIG. 12 is a section along the line F—F in FIG. 10;

FIG. 15 is a section along the line H—H in FIG. 14;

FIG. 16 is a section along the line G—G in FIG. 14;

DETAILED DESCRIPTION OF THE INVENTION

Figure 2:
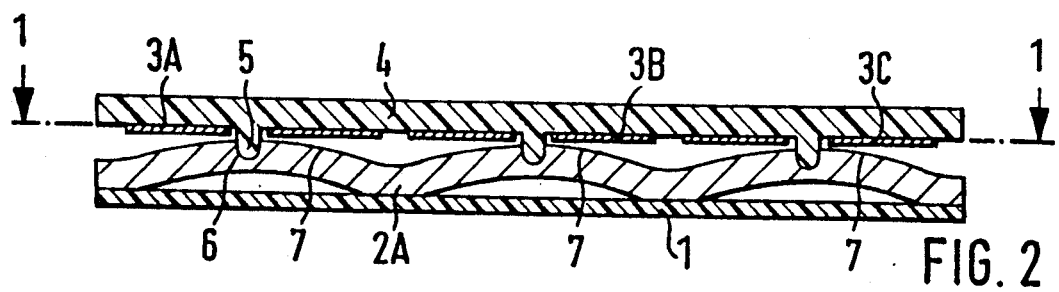

Three strip-like conductive paths 2A, 2B, 2C of a foil made from a resistive material are placed on a foil-like base 1 which is comprised of an electrically non-conductive material. The conductive paths 2A, 2B, 2C extend spaced from one another and parallel and are, thus, electrically insulated from one another. The three conductive paths 2 are each electrically interconnected on the left side; thus they have a common terminal 0. Separate electrical terminals A1, A2, A3 are provided on the right side for each conductive path. By measuring the voltage drop between connection 0, on the one hand, and the terminals A1, A2, A3, on the other hand, and/or by measuring the currents flowing through the terminals A1, A2, A3, it is possible to determine the respective electrical resistance of the conductor paths 2. If the pressure sensor is not acted upon by pressure, then the electrical resistance of the conductor paths 2A, 2B and 2C are equal.

Three electrical flat conductive paths 3A, 3B, 3C, which are spaced from one another and are thus electrically insulated from one another, extend over the conductive paths 2A, 2B and 2C, crossing conductive paths 2A, 2B and 2C at right angles. Each conductive path 3A, 3B, 3C is connected to terminal A, B and C respectively. These conductive paths are placed on a flat, electrically non-conducting additional foil 4. The conductive paths 3A, 3B, 3C are comprised of good electrically conducting material which is, for example, steamed onto the additional foil 4.

Figure 3:
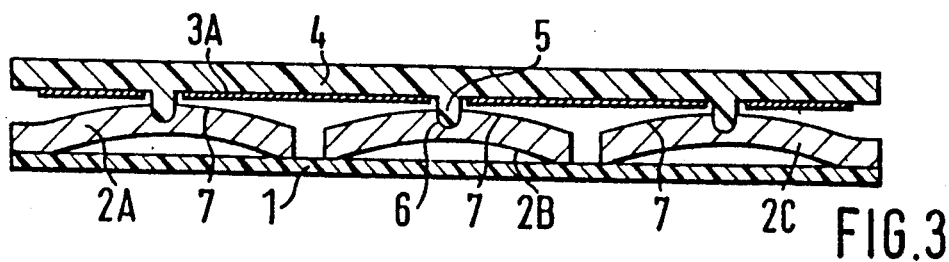

At each point of intersection between a conductive path 2A, 2B and 2C with a conductor path 3A, 3B and 3C, the conductor paths 2A, 2B and 2C, being comprised of an elastic foil, are curved convexly in the direction of the respective conductive path 3A, 3B and 3C. Furthermore, the additional foil 4 has a nipple 5 located at each of the points of intersection; the nipple 5 is caught in a corresponding recess 6 on each convexly curved surface 7. The conductor paths 2A, 2B and 2C have recesses 6 in the area of each nipple. As seen in FIGS. 2 and 3, the nipples 5 hold the conductor paths 3A, 3B, 3C at a short distance from the surface of the conductor paths 2A, 2B, 2C.

Figure 1:
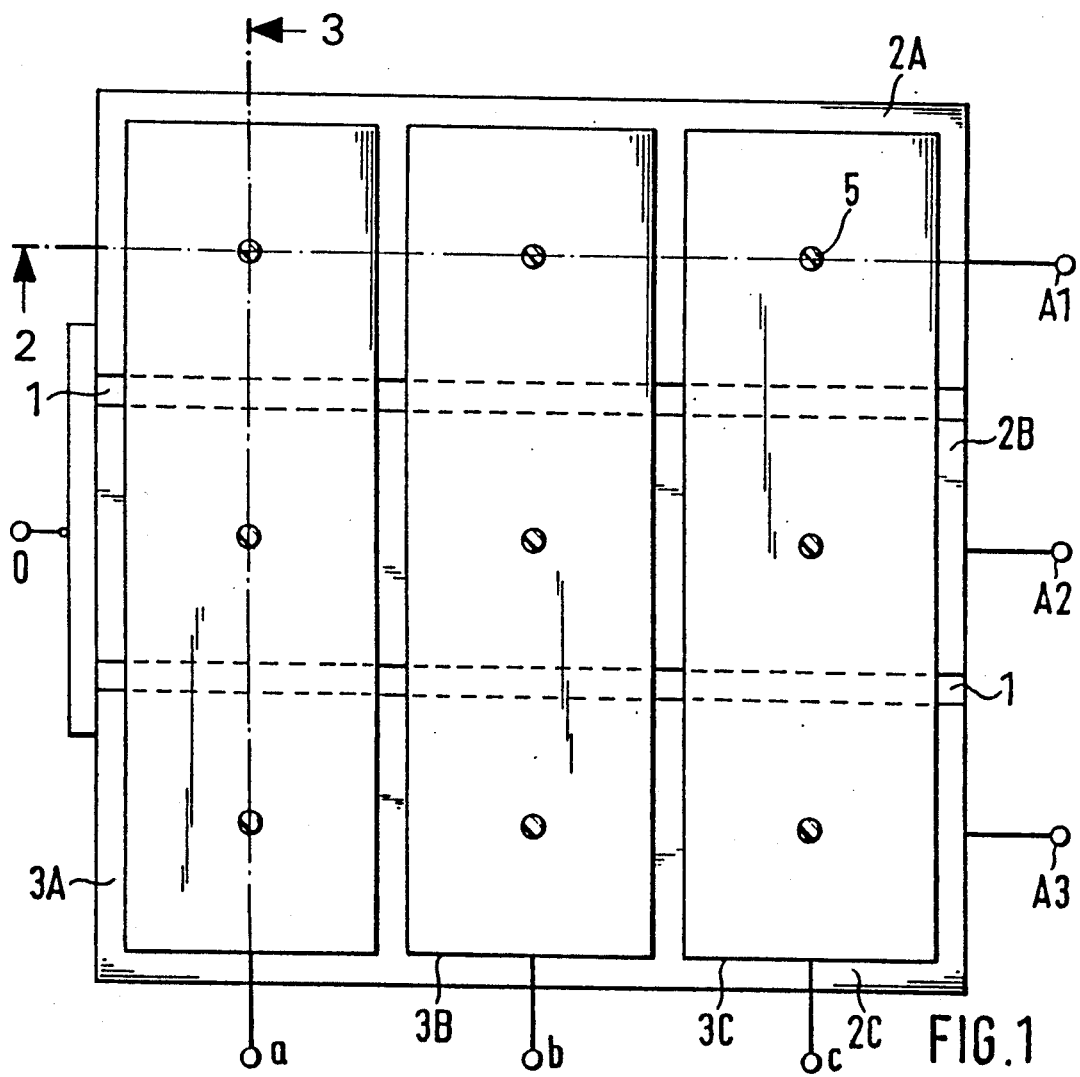
Figure 4:
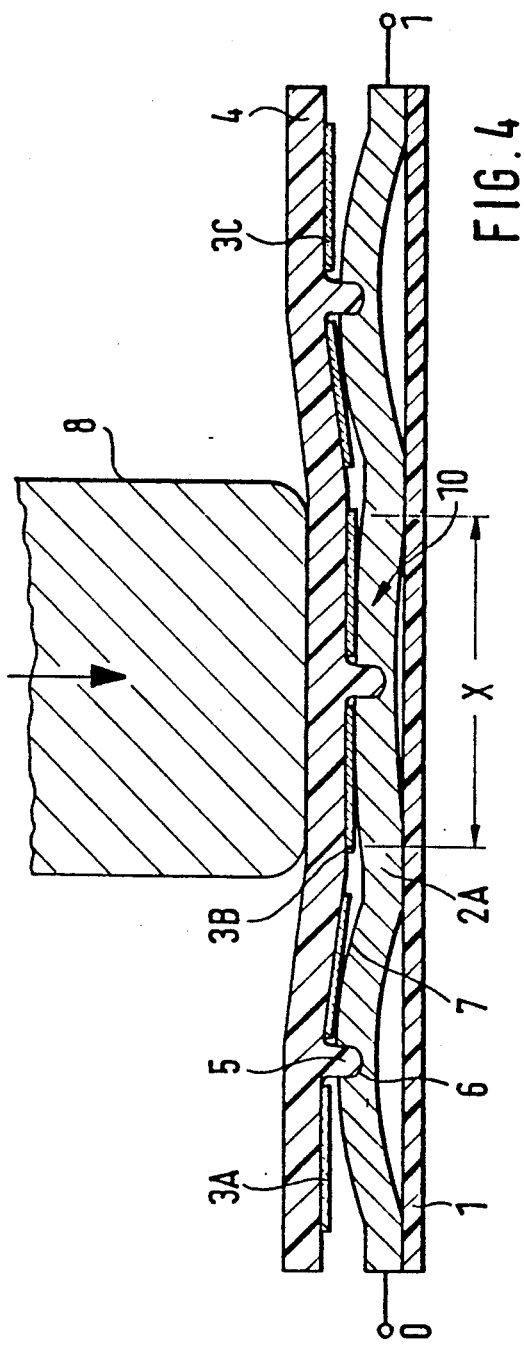
Figure 21:
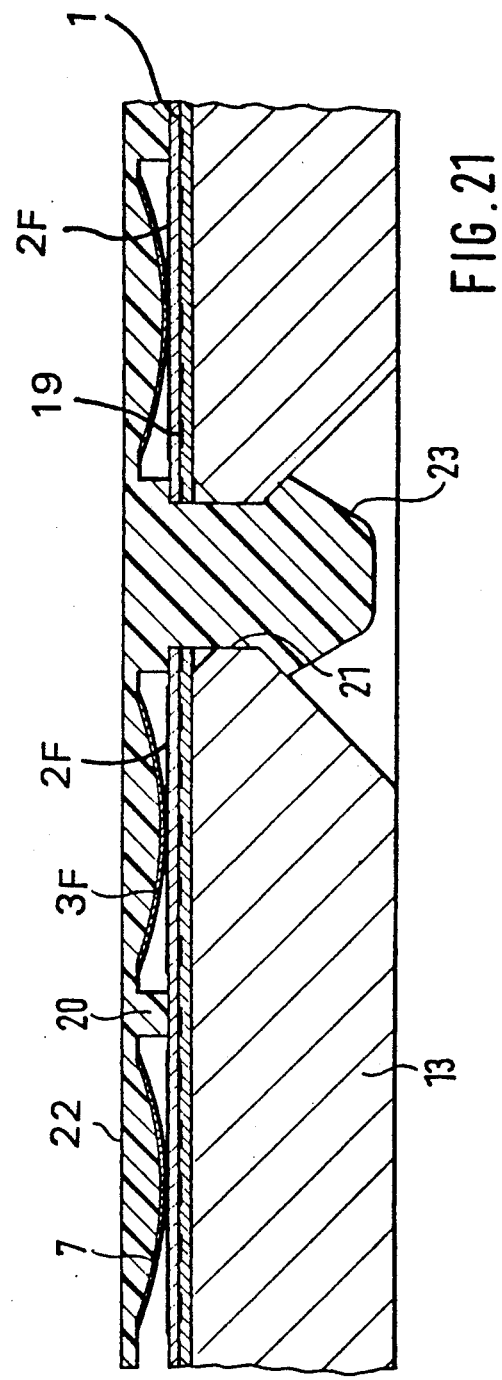
FIG. 21 is an angular vertical section through the sensor according to the sixth embodiment.

If a pressure is, for example, exerted on the pressure sensor by a pin 8, then, for example, the conditions in FIG. 4 result. In this case, conductor path 3B, comprised of metal, comes into flat contact with conductor path 2A, comprised of a resistive material, and thereby bridges it over the length X. The ohmic resistance of conductor path 2A, measured between terminal 0 and A1, is thus determined by the total length of path 2A minus the length X. Moreover, conductor path 3B assumes a potential which corresponds to half the potential difference between connections 0 and A1 and which occurs at terminal B. By means of the potential occuring at terminal B and by the drop of the resistance between terminals 0 and A1 and/or by the increase in the current flowing over terminal A1, the location at which pin 8 acts on the sensor can be determined, that is, cell 10 where conductor path 3B and conductor path 2A cross. Cell 10 is for example, the upper, central cell in FIG. 1.

The amount of pressure exerted by pin 8 determines the amount of deformation of the convexly curved area of conductor paths 2 of each cell 10. This deformation is proportional to the pressure and thus proportions the length X over which conductor paths 2 and 3 come in contact with one another. As a result, the drop in resistance in conductor path 2, caused by length X, exhibits the amount of pressure exerted.

In the embodiment according to FIGS. 5 to 9, two- or three-dimensional convexly curved, round conductors 2D are located on base 1 (see FIG. 8); conductors 2D are comprised of a resistive material and are connected to one another in vertical direction by conductor elements 11 made of a good electrically conducting material. These have a convexly curved surface 7. Above these rigid conductors 2D, an elastic foil 12 is stretched which has circular conductors 3D, made of a good conducting material, on its underside opposite conductors 2D (see FIG. 9) and which are, for example, steamed to adhere onto foil 12.

Conductors 3D, which are considerably convexly curved, are located on foil 4 opposite conductors 2D. The convexly curved conductors also are comprised of a resistive material and are connected to one another in the horizontal direction by conductor elements 9 (see FIG. 6), each of which have a concavely curved surface 7A. Opposite these on the upper side of foil 12 are located two wedge-shaped conductors 3E each (FIG. 7), which are electrically separated from one another and are made of a good electrically conducting material and whose points are directed horizontally toward one another. Foil 12 is held on foils 1 and 4 by means of rivets. Conductors 2D with conductor elements 11 form vertically extending conductor paths in each case, whereas conductors 2E with conductor elements 9 form horizontally extending conductor paths which each are comprised essentially of a resistive material and whose resistance value is determined.

If pressure is exerted on elastic foil 4, then elastic foil 12 fits snugly and pressure-proportionately over surface 7 and into surface 7A, whereby conductive paths 3D and 3E bring about a pressure-proportionate bridging of conductors 2D and 2E by a resistive material. The variation in resistance brought about thereby enables the pressure to be detected with respect to both location and amount.

Figure 5:
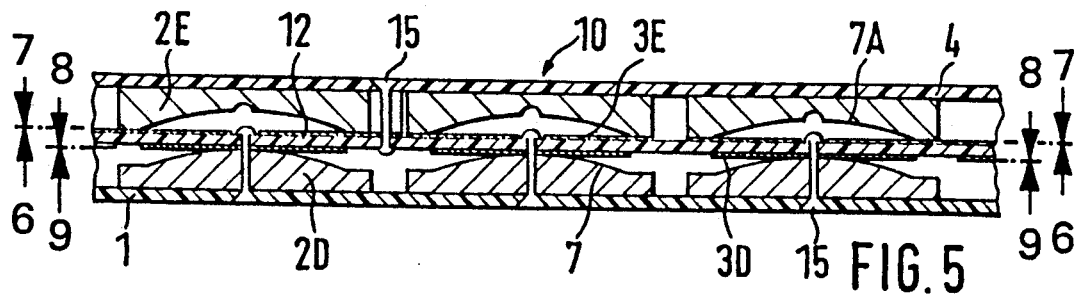

In the embodiment according to FIGS. 5 and 9, conductors 2D and 2E, which are each placed in a row, are connected in series so that the location and amount of pressure exertion can be ascertained by measuring the resistance of the series connection in the horizontal and vertical direction.

Figure 10:
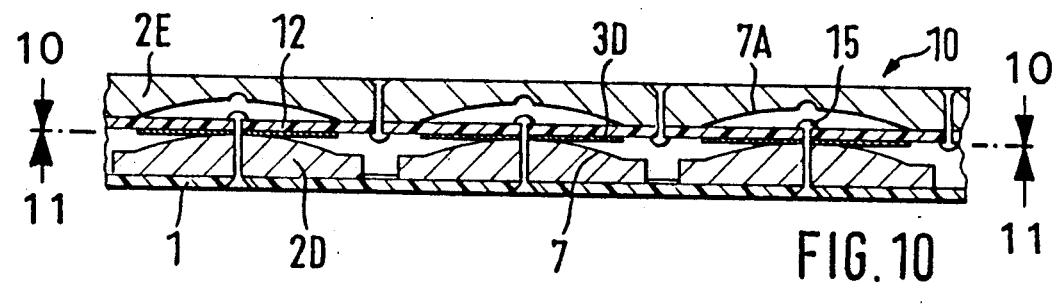
FIG. 10 is a vertical section through a third embodiment of the sensor.

In the embodiment according to FIGS. 10 to 12, which in essence corresponds to the embodiment of FIGS. 5 to 9, terminals for 10 are provided for each conductor 2D, as a result of which of course the number of terminals is increased, however, it is then possible to ascertain the amount of pressure in each individual cell 10. As shown in FIG. 10, individual conductors 2E are not provided in the horizontal direction, but, instead, are designed as one continuous piece so that conductor elements 9 are no longer necessary.

Figure 13:
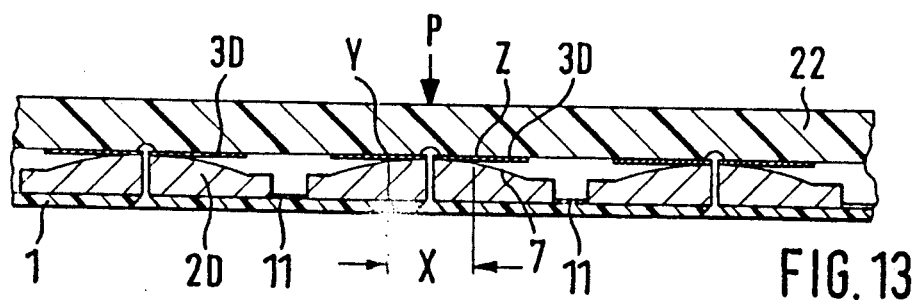
FIG. 13 is a vertical section through a fourth embodiment of the sensor.

In the embodiment according to FIG. 13, the conductors 2D comprised of a resistive material are also rigidly constructed. The conductors 3D, consisting of a good conducting material are disposed on an elastic foil 22, which presses closely on concave surface 7 dependent on pressure P from point Y to point Z, as a result of which conductor 3D electrically bridges the distance X on conductor 2D. This type of a sensor enables one to ascertain the location of the pressure and its amount in a coordinate direction. For the second coordinate, which extends perpendicular to it, a second, similarly constructed sensor which has, however, been turned by 90° in relation thereto, is used. The sensor illustrated in FIG. 13 is also suitable for use in the form of a variable resistance so that it can be used as a path sensor.

Figure 14:
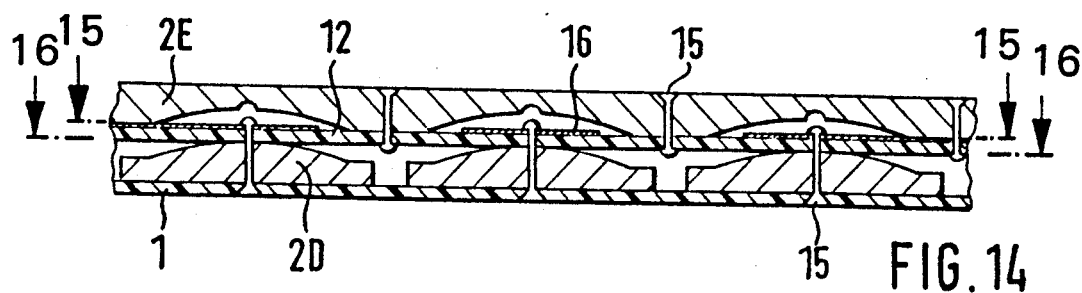
FIG. 14 is a vertical section through a fifth embodiment of the sensor.
Figure 17:
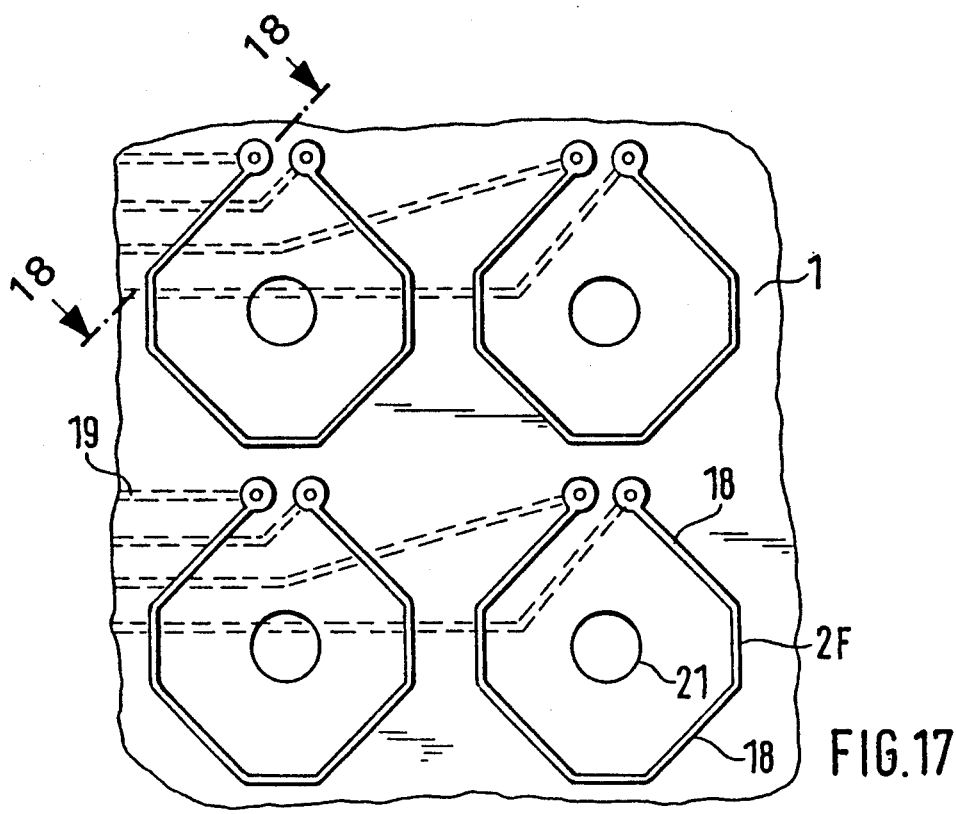
FIG. 17 is a top view of the plate having resistance paths according to a sixth embodiment.
Figure 18:
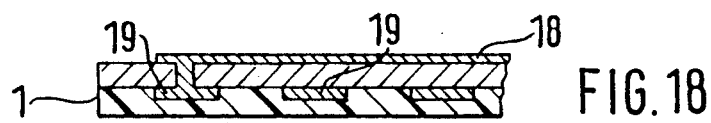
FIG. 18 is a section along the line A—A in FIG. 17.
Figure 19:
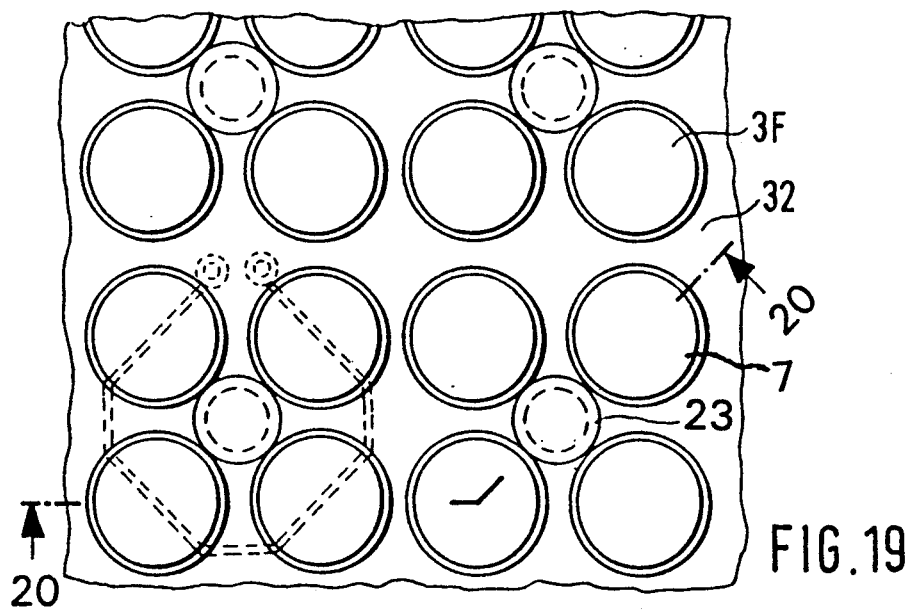
FIG. 19 is a top view of a plate having conductor paths according to a sixth embodiment.
Figure 20:
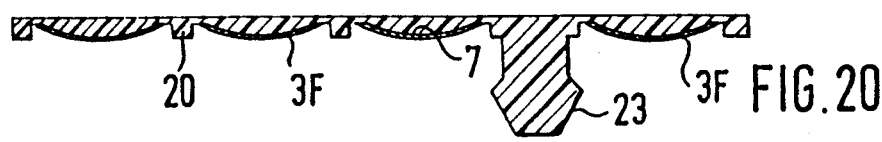
FIG. 20 is a section along the line B—B in FIG. 19.

In the embodiment according to FIGS. 14 to 16, which in essence corresponds to the design of the embodiment in FIGS. 10 to 12, measuring strips 16 are provided in foil 1 at each cell 10, each of these having terminals 17, whereby it is possible to measure the pressure acting at each cell 10.

In the embodiment according to FIGS. 17 to 21, foil 1, comprised of two layers, and having conductive paths 2F made of a resistive material on its upper side, is disposed on a base 13. Every conductive path 2F is part of a cell 10. Every conductor path 2F has 4 straight conducting elements 18, whereby adjacent conducting elements 18 extend at right angles to one another. The two ends of each conductor path 2F are electrically connected to terminals 19 which extend between the two layers of foil 1 and which are comprised of good electrically conducting material.

An elastic foil 22 is disposed on foil 1. In the area of the straight conducting elements 18, the elastic foil 22 has convex surface areas 7 on each of which a layer is formed with a conductor path 3F made from a good conductive material. The convex surface areas 7 are circular in shape. Spacers 20 are provided between the convex surface areas 7. In the centre of every conductor path 2F, a bore 21 is placed in foil 1 and base 13. A nipple 23 of the elastic foil 22, which has a thickened head, is caught in the bore 21. The connection between foil 22 an base 13 is thus made. Each conductor path 2F, in connection with 4 convex surface areas 7 on each of which a conductor path 3F is disposed represents a cell 10.

If pressure is exerted on the elastic foil 22, then the convex surface areas 7 press closely against foil 1, whereby conductor paths 3F pressure-proportionately bridge conducting elements 18 of conductor path 2F and, thus, change, i.e. lower, the resistance of each cell 10, which can be measured at connections 19.

I claim:

1. A tactile sensor comprised of at least two parallel plates, at least one of the plates being elastic, the plates being formed into a number of pressure-sensitive measuring cells, each cell having a first conductive path on one plate and a second conductive path on the other plate, one of the two conductive paths being comprised of good electrically conducting material, the other conductive path being comprised of electrically resistive material, the two conductive paths of each cell extending in the same direction, at least one of the conductive paths being in the form of a uniformly curved surface, means for retaining the two conductive paths of a cell adjacent each other whereby when pressure is exerted resulting in deformation of the elastic material of the elastic plate the conductive paths come into contact with each other in a cell with the length of the contact being proportionate to the pressure, thus causing variation of the resistance of the other conductive path, allowing the pressure at the location at which the pressure is exerted to be determined by measurement of the resistance of said other conductive path.

2. A tactile sensor according to claim 1, in which the uniformly curved surface is convex.

3. A tactile sensor according to claim 1, in which each cell is formed of a convexly curved conductive path and of a flat conductive path, and at least one of the conductive paths being disposed on or is comprised of an elastic foil.

4. A tactile sensor according to claim 3, in which the convexly curved conductive path is comprised of an elastic resistive material and the flat conductive path is disposed on an elastic foil.

5. A tactile sensor according to claim 3, in which the convexly curved conductive path is comprised of a rigid resistive material and the flat conductive path is disposed on a plastic foil.

6. A tactile sensor according to claim 3, in which the convexly curved conductive path is comprised of an elastic, highly conductive material and is disposed on the convexly curved surface of an elastic foil.

7. A tactile sensor according to claim 5, in which the elastic foil is comprised of a rubber material which can be deformed.

8. A tactile sensor according to claim 5, in which a concavely curved conductive path is disposed on the side of the foil which is opposite the convexly curved conductive path and the foil is comprised of two wedge-shaped conductive paths on that side.

9. A tactile sensor according to one of the claims 1 to 8, in which the conductive paths comprised of a resistive material, of adjacent cells are situated in a row and are electrically connected in series.

10. A tactile sensor according to one of the claims 1 to 8, in which the conductive paths comprised of a resistive material, of the cells are attached to separate terminals.

11. A tactile sensor according to claim 8, in which the foil has a wire strain gauge connected between the concavely and convexly curved conductive paths.

12. A tactile sensor according to claim 4, in which several of said first conductive paths of several cells made from the elastic resistive material are disposed adjacent to one another and are in the form of strips which are convexly curved in each cell, the cells of adjacent conductive paths being crossed by strip-shaped second conductive paths made of a good electrically conducting material, which are disposed of the elastic foil.

13. A tactile sensor according to claim 5 or 8, in which the foil is held stretched over the convexly curved conductive path.

14. A tactile sensor according to one of claims 3 to 6, in which the conductive paths made from a good electrically conducting material are electrically separated from one another.

15. A tactile sensor according to claim 6 in which the flat conductive path made from a resistive material of a cell has several straight conducting elements, each of said elements being located adjacent a separate convexly curved surface of the elastic foil, the conductive path made from good electrically conducting material being disposed on this surface.

16. A tactile sensor according to claim 15, in which adjacent conducting elements extend at right angles to one another and the elastic foil has spacers surrounding the convexly curved surfaces, said spacers adjoining the surface of the foil having the flat conductive paths.

17. A tactile sensor according to claim 16, in which a nipple, which catches in a bore of a base having the flat conductive paths extends from the elastic foil, and is centred in relation to each of the four convexly curved surfaces of each cell.

* * * * *